Nov. 19, 1935.   W. F. ALDER   2,021,573
THERMOBALANCE
Filed Dec. 22, 1933
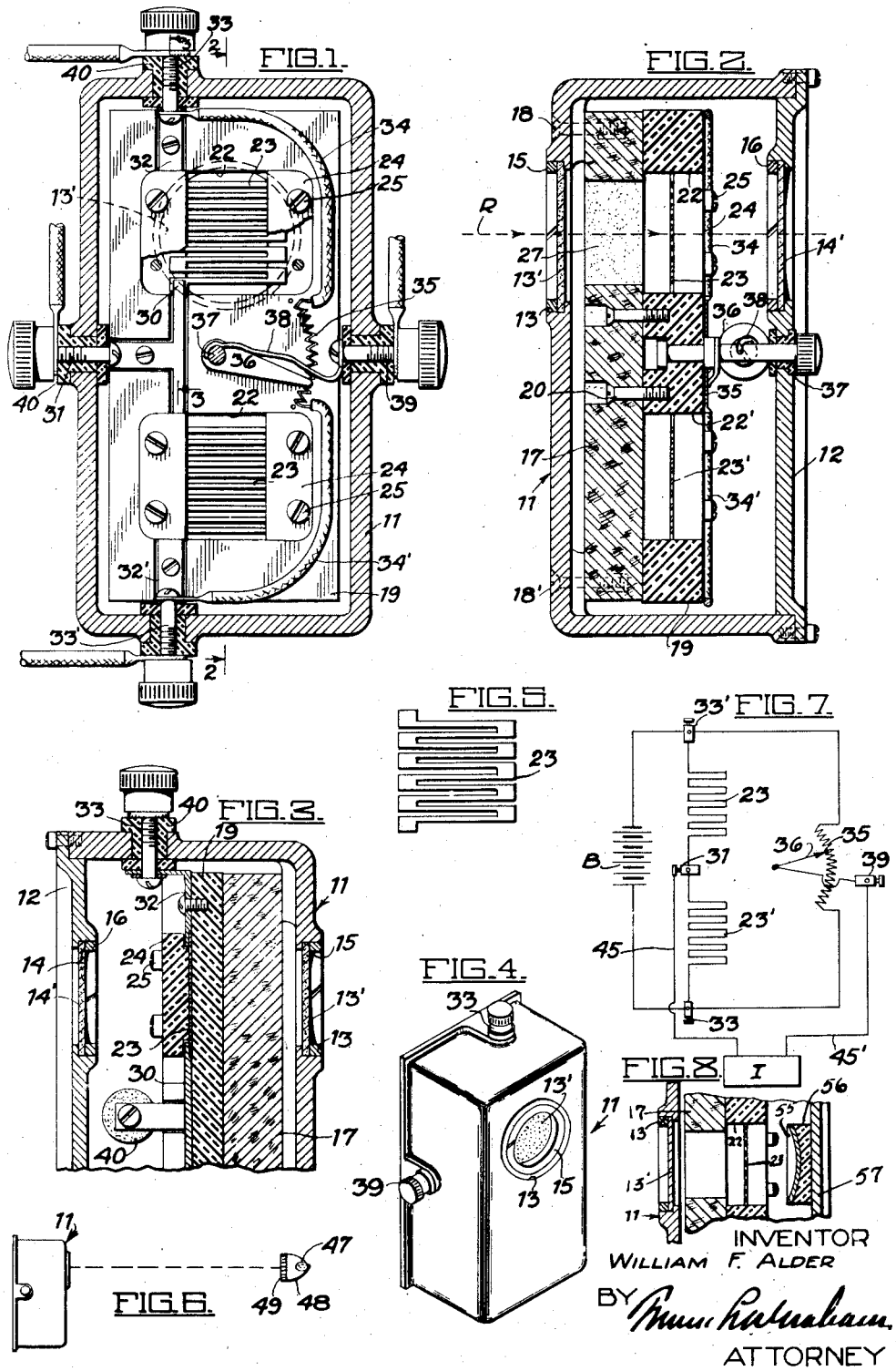
INVENTOR
WILLIAM F. ALDER
BY
ATTORNEY Patented Nov. 19, 1935

2,021,573

UNITED STATES PATENT OFFICE 2,021,573

THERMOBALANCE

William F. Alder, Altadena, Calif., assignor of one-half to Howell & Sherburne, Pasadena, Calif.

Application December 22, 1933, Serial No. 703,661

7 Claims. (Cl. 201—63)

This invention has to do in a general way with electrical devices which are influenced by radiant energy or radiant energy changes to give a sensible indication. More specifically, my invention contemplates an electrical device which, when exposed to a beam of radiant heat, will produce an electrical effect commensurate in magnitude with the intensity of the exposing beam.

It is a primary object of this invention to produce a device of the class described which depends solely upon radiant heat (or the infra red wave lengths of the spectrum) for its operation. In other words, my invention contemplates a device which is immune to mere temperature variations in the medium (atmosphere for example) surrounding the instrument.

My invention is adapted for a multiplicity of uses, among which are: Closed circuit burglar alarms, utilizing an invisible beam of radiant heat; a measuring device for smoke density in chimney flues, operable because of the change of density and absorption of radiant heat by flue gases containing free carbon; it is applicable for measuring the density of all gases, whether transparent or not, due to the faculty of all gases absorbing radiant heat according to their molecular composition; it can be set up as a fire alarm or as a thermostat, and can be so adjusted as to announce the contiguity of vessels at sea, or bodies of land and icebergs; also in aeronautics, for indicating the distance of the ship above the surface of the ground. It can also be employed in conjunction with a heat beam or a beam of infra red light to reproduce sound from sound track on film.

The operation of the device contemplated by this invention is based upon the property which certain materials, such as platinum, have of changing in electrical resistance under the influence of radiant heat.

The general construction of the instrument contemplated by this invention comprises a pair of grids formed of a material of the type just referred to (preferably coated with a substance such as colloidal platinum black or lamp black which has a high absorptive coefficient with respect to radiant heat) and connected in a balanced circuit such as the standard Wheatstone bridge so that the two grids constitute adjacent arms of the circuit. The other two adjacent arms of the circuit are connected to a variable resistance such as a potentiometer wire, and the two sets of arms are connected across a suitable indicating device such as a galvanometer or a milliameter, or in practice the standard indicating device may be supplanted by a standard type of sensitive relay, this being particularly the case when the device is used as a burglar alarm, a smoke indicator, or for other warning purposes.

The two grids and the variable resistance are of course connected in parallel with a source of electrical energy such as a battery, as is well known to those familiar with the Wheatstone bridge circuit.

The grids are preferably made so that under normal conditions they both have the same resistance and when the circuit is balanced it will be apparent that as long as both grids have the same resistance, regardless of how this resistance may fluctuate, the circuit will remain in its balanced condition. If the resistance of one of the grids is changed, however, the circuit is thrown out of balance and a sensible indication is obtained through what I may term the "indicating means", whether such means be a standard indicating instrument or a relay. I take advantage of this fact to render the instrument immune to temperature variations in the surrounding medium by enclosing the grids in a tight case or cell and supporting them therein in a manner such that they are both thermally and electrically insulated from the case. In this way, I eliminate the possibility of any variations in temperature between the grids due to convection, and, since the temperature throughout the interior of the case is uniform, it will be seen that any fluctuations in temperature within the case will be the same in both grids and consequently will not unbalance the instrument.

In order that the circuit may be "unbalanced" to give a sensible indication under the influence of radiant energy, I provide in the side of the case or cell, opposite only one of the grids, a window formed of material which is transparent to radiant heat. The other grid is completely shielded by the case so that exposure of the instrument to beams of radiant heat causes a change in the resistance of one grid only, thereby throwing the circuit out of balance.

It is an object of this invention to provide, in the instrument of the class described, means for protecting the beam of radiant heat, which acts upon the exposed grid, against any losses due to conduction around the periphery of the window through which the beam enters the case. This object is accomplished by interposing between the inner surface of the case and the grid a slab of heat insulating material such as cork which is provided with an opening situated in substantially coaxial relation with the window and the grid but being of a size smaller than both the window and the grid. This cork also provides a mounting for the grid frame or grid support and assures complete insulation of the grids from the case.

It is a further object of this invention to provide means for preventing any absorption by the rear wall of the case of radiant heat passing the openings in the grid. This is accomplished in one way by providing a case of the class described with double windows arranged in coaxial relation in opposite sides of the grid which makes it possible to introduce the beam of radiant heat into one side of the case and let those portions of the beam not absorbed by the grid escape through the rear window. This construction also permits the use of two beams of heat in the same axial alignment applied at the same time to a single cell unit which makes possible a reduction in the number of devices necessary to completely protect premises of large extent from burglars since it cuts the number of cell installations in half in respect to present day practice. Another way of accomplishing this object just referred to is to provide a concave reflector behind the grid which directs the transmitted radiant heat back onto the grid. This latter construction is particularly valuable where extreme sensitivity is desired.

It is a further object of this invention to produce an instrument of the class described which is sensitive to even the smallest variations in the impinging beam. With this object in mind, I have discovered that the sensitivity of the instrument is largely a function of the thickness of the grid, and to this end it becomes a still further object of this invention to provide an instrument of the class described which is equipped with grids having a thickness not to exceed one wave length of light or one fifty-thousandth of an inch.

I have also discovered that for most satisfactory results the grid should be formed of platinum or a metal having a molecular weight lying between 192 and 196.

The method of forming this extremely thin platinum foil and the procedure followed in cutting the grids therefrom and mounting them in the grid support or frame plate constitutes a further important feature of this invention.

The details in the construction of a preferred form of my invention, together with the method of forming and supporting the grids, and other objects attending its production will be best understood from the following description of the accompanying drawing which are chosen for illustrative purposes only, and in which—

Fig. 1 is a sectional elevation taken through the back of an instrument contemplated by this invention;

Fig. 2 is a sectional view taken on the plane represented by the line 2—2 of Fig. 1;

Fig. 3 is a fragmentary section taken in a plane represented by the line 3—3 of Fig. 1;

Fig. 4 is a perspective view further illustrating the construction of the case contemplated by this invention;

Fig. 5 is a plan view of a preferred form of grid contemplated by this invention;

Fig. 6 is a diagrammatic view illustrating the manner in which the device contemplated by this invention may be used in conjunction with an alarm system or the like;

Fig. 7 is a wiring diagram illustrating the circuit employed in conjunction with the instrument contemplated by this invention; and Fig. 8 is a fragmentary section of a modified form of my invention.

More particularly describing the invention as herein illustrated, reference numeral 11 indicates a case or cell having a closure plate 12. The case is chromium plated and highly polished to the end that it will reflect heat rather than absorb it.

Reference numerals 13 and 14 indicate window openings which are formed in coaxial alignment with each other on opposite sides of the case. In the form shown, these window openings are provided on the front face and in the rear closure plate.

These window openings contain windows 13' and 14' which are formed of a material, transparent to radiant heat waves, which is preferably opaque to the visible rays of the spectrum, and may be ground to refract the heat waves as they enter the cell to concentrate them on a grid in the cell. A preferred form of such material is fluorspar coated with asphaltum, rock salt, or special heat transmitting glasses as are now commercially obtainable. The windows are held in place by suitable retaining rings indicated by reference numerals 15 and 16.

Mounted within the case behind the front window 13', I provide a slab of heat-insulating material such as cork which is indicated by reference numeral 17, and is shown as being held in place by suitable screws indicated at 18. This slab of material constitutes a support for what I may term a dielectric grid supporting plate or frame, indicated by reference numeral 19, such plate being secured to the cork through the medium of screws 20.

The plate 19 is provided with what I may term a first opening 22 situated in coaxial relation with the two window openings 13 and 14 and preferably being of a size slightly smaller than such window openings. The opening 22 contains what I may term a first grid 23, the form of which is best illustrated in Fig. 5, such grid being held in place by retaining blocks 24 and 24' mounted in recesses formed in the plate 19 adjacent the opening 22 and held therein by means of screws 25.

In addition to the opening 22, the plate 19 is provided with, what I may term, a second opening 22' which is situated a substantial distance away from the first opening so that it is completely shielded by the walls of the case. This second opening contains, what I may term, a second grid 23' held in place by blocks 24 and screws 25, similar to those described above.

In order that the radiant heat beam which I have indicated by the letter R may be directed upon the grid 23 without interference or loss due to conduction, I provide the insulating slab 17 with an opening 27, such opening being smaller than either the window opening 13 or the grid opening 22.

The inner adjacent ends of the grids 23 and 23' are connected in any suitable manner such as by soldering to the terminals of a T-shaped bus bar 30, which is turn is connected to a terminal post 31. The outer ends of the grids 23 and 23' are connected to bus bars 32 and 32' which in turn are connected to terminal posts 33 and 33' respectively.

The terminal posts 33 and 33' are also connected through conductors 34 and 34' to the terminals of a resistance 35 which is engaged by a contact finger 36, to form a variable rheostat which constitutes the "balancing means" in the balanced circuit, mounted on a post 37 which is connected through a conductor 38 to a fourth terminal post 39.

All of the terminal posts are equipped with insulated bushings indicated generally by reference numeral 40, such bushings being composed of a material such as "Bakelite" or "Lavite" which are non-conductors of both heat and electricity.

Relative to the variable rheostat, it will be understood that it may be a separate element or a separate instrument, but for maximum sensitivity I prefer to mount the resistance in the cell with the grids and form it of the same material as the grids or a material having the same temperature-resistance coefficient as the material of the grids.

From Fig. 7, which shows the wiring diagram of the instrument described above and illustrating the complete circuit in which such an instrument is used, it will be observed that the circuit is the conventional Wheatstone bridge. The grids 23 and 23' comprise two adjacent arms of the bridge, both of which are connected through a conductor 45 with one side of an indicating instrument "I" which, as has been pointed out above, may be a standard indicating instrument or a sensitive relay. The other side of the instrument is connected through a conductor 45' with the terminal post 39 which in turn is connected to the wiper 36 on the variable rheostat. The terminal posts 33 and 33' are connected to a source of electric energy such as the battery B.

Depending upon the results desired, the instrument may be used in a balanced or unbalanced condition. In other words, the instrument may be placed so that the grid is not exposed to a source of radiant heat and the rheostat set so that no current is flowing through the circuit, such setting being indicated by a zero reading on the instrument "I". When balanced in this manner, the direction of radiant heat against the grid through the window 13' will unbalance the circuit and will cause a flow of current through the instrument "I", the magnitude of such current being proportional to the intensity of the beam striking the grid 23. The most minute variations in the intensity of the beam which might be occasioned by interposing a gas or other medium between the source of heat and the grid will be immediately shown upon the indicator, and in this way the instrument may be utilized for such delicate purposes as to analyze and detect gases or water vapors.

When using the instrument in an unbalanced condition, a constant beam of radiant heat is first directed upon the grid 23 and the rheostat is set so that a relay or other suitable device at "I" will be operated when the beam is intercepted. The instrument is used in this manner in an alarm system. Such a set-up is illustrated in Fig. 6 where the source of radiant heat is shown as comprising a light 47, a reflector 48, and a filter 49, the filter being formed of a material which will permit only the invisible heat rays of the spectrum to pass.

In Fig. 8, I show a modified form of my invention wherein the parts identical with those described above are indicated by the same reference numerals. In this form of my invention, instead of providing a window in the rear of the case to pass the heat waves which are not intercepted by the grid, I propose to return these transmitted waves to the grid by means of a concave reflector which is shown as being mounted on an insulating block 56 secured to the rear wall 57 of the case or cell.

It was pointed out above as another important object of this invention to provide a method for forming and mounting the extremely sensitive grids. Broadly, the procedure followed in forming and mounting the grids is to plate a thin piece of platinum foil to an appreciable thickness with a metal which will react with or be dissolved by a reagent that will not attack the platinum or the materials comprising the frame or plate support for the grids. The plated foil is then rolled by a careful process of repeated operations until its thickness is reduced in the order of ten to one. The rolled foil may then again be plated with the same metal and rolled again, after which the grid is cut with a suitable die, mounted in the frame or grid support and immersed in the reagent which removes the coating metal and leaves the extremely thin foil suspended in the frame.

As a specific example of the procedure followed in forming and mounting the grids, I take a piece of chemically pure material, preferably platinum or a metal or metal alloy having the desired properties, one thousandth of an inch in thickness and coat the same with silver in the finest molecular state as is possible with a plating bath. I have found that the depositation of the first one thousandth of an inch of silver on each side of the platinum foil requires, for the fineness and close adherence necessary, a period of sixteen hours minimum. In practice the platinum foil is hung in the silver bath and depositation carried on with a current of the least possible magnitude for this period in order that the migration of silver from the anode shall be as slow as possible. This is done for the purpose of obtaining a perfectly adherent coating on the platinum as subsequent practice proves that the slightest unevenness of coating results in a blistered condition which precludes the successful conclusion of the other steps in the process. I have discovered that as the silver coating gets thicker, the current in the plating bath may be gradually increased until the coating has reached a thickness of six thousandths of an inch, after which a normal plating rate may be used.

When the thickness of the platinum silver "sandwich" has reached ten thousandths of an inch, it is put in a jeweler's rolling mill and rolled down by successive steps to a thickness of one thousandth of an inch. A film of oil is maintained on the rolls at all times during the rolling operation. It is important during the rolling operation to maintain a very light pressure on the rolls in the first stages of rolling, only one-fourth of a thousandth of thickness being accomplished for each rolling until the metal has been reduced to five thousandths total thickness. Each time the sandwich is inserted in the rolls it requires annealing and the bringing up of the sandwich to a low, red heat for a period of not less than five minutes with a subsequent cooling of fifteen minutes at a gradually reducing temperature. Having been thus annealed after each rolling, I have found it mandatory to insert first in the rolls that end of the metal which last passed through the roll during the previous rolling operation, together with the inversion of the strip so that the surface of the strip which first emerged from the rolls on top is now placed so as to become the underneath surface. The rolling is thus continued with successive changes of position of the strip in the rolls and the annealings until the sandwich has been reduced to one thousandth of an inch in thickness. The resulting ribbon is then taken back to the plating bath and, by the same process as theretofore, brought up to a further thickness of five thousandths of an inch, after which it is returned to the rolls after having been cut into lengths which the width of rolls will accommodate. It is then subsequently rolled as before with regard to the technique, with the one addition that for every four longitudinal rollings, I have found it necessary to make one transverse rolling as this seems to prevent the forming of a longitudinal fibrous structure and stria which seriously interfere with the subsequent process. When these strips or sandwiches have been reduced to one thousandth of an inch, they are mounted on thin sheets of sheet steel by soldering around the edges, and, laid over the tops of these, are similar strips of thin sheet steel (three thousandths of an inch thick) which are in turn soldered to the lower strip of steel, thus making a substantial body of metal upon which the die and punch-press can operate successfully—the one thousandth of an inch material being too difficult to manipulate commercially.

One of the functions of the sheet steel is to give a hard brittle material for the cutting edges of the die to operate upon, thus there is no snagging, turning, nor tendency of the thin material to follow the male portion of the die into the female portion of the die.

The extractor of the die pushes up a composite grid consisting of the silver platinum grid and two others consisting of the two steel plates. These are peeled off of the silver grid and it is mounted in the "Bakelite" frame 19 with the two terminal lugs in position and are laid upon the brass connected bus bars which are to form the electrical circuit. It is soldered into this position onto the bus bars 30, 32, and 32', then the "Bakelite" clamps or blocks 24 and 24' are screwed into position. This done, the whole "Bakelite"-grid assembly (19) is immersed in a dilute solution of nitric acid which instantly dissolves the silver from the grid and leaves the exposed platinum suspended free in the grid opening. The assembly is then washed in dilute ammonia water and subsequently washed for one hour in running water to remove all traces of acid. It is then carefully dried and the grid is finally plated with platinum black or coated with a suspension of colloidal lamp black in a Pyroxylin varnish dissolved in amyl acetate. The proportions are about twenty per cent lamp black to the varnish and the varnish contains about five per cent Pyroxylin dissolved in amyl acetate. The "Bakelite" grid mounting is then ready for final mounting in the cell casting or case 11, after which the cell with its windows is sealed.

It is to be understood that, while I have herein described and illustrated one preferred form of my invention, the invention is not to be limited to the precise construction as described above, but includes within its scope whatever changes fairly come within the spirit of the appended claims.

I claim as my invention:

1. In a thermo balance of the class described: an enclosed case having a relatively small window opening in one side thereof; a window in said opening composed of material which will refract the invisible waves of the spectrum and is opaque to the visible rays of the spectrum; a dielectric plate in said case having a first opening opposite said window and a second opening similar to the first spaced away from said window; a first conductive grid mounted in said first opening; a second conductive grid similar to said first grid mounted in said second opening; an electric circuit connected to said grids whereby the resistance of one may be balanced against the resistance of the other; and a plate of heat insulating material interposed between said dielectric plate and the side of said case containing said window, said heat insulating plate having an opening therein situated between said first window and said first grid.

2. In a thermo balance of the class described: an enclosed case having a relatively small window opening in one side thereof; a window in said opening composed of material which is transparent to radiant heat; a dielectric plate in said case having a first opening opposite said window and a second opening similar to the first spaced away from said window; a first conductive grid mounted in said first opening; a second conductive grid similar to said grid mounted in said second opening, an electric circuit connected to said grids whereby the resistance of one may be balanced against the resistance of the other; and a plate of heat insulating material interposed between said dielectric plate and the side of said case containing said window, said heat insulating plate having an opening therein smaller than said window and situated between said first window and said first grid.

3. In a thermo balance of the class described: an enclosed case having a relatively small window opening in one side thereof; a window in said opening composed of material which is transparent to radiant heat; a dielectric plate in said case having a first opening smaller than and opposite said window and a second opening similar to the first spaced away from said window; a first conductive grid mounted in said first opening; a second conductive grid similar to said first grid mounted in said second opening; an electric circuit connected to said grids whereby the resistance of one may be balanced against the resistance of the other; and a plate of heat insulating material interposed between said dielectric plate and the side of said case containing said window, said heat insulating plate having an opening therein situated between said window and said grid.

4. In a thermo balance of the class described: an enclosed case having a relatively small window opening in one side thereof; a window in said opening composed of material which is transparent to radiant heat; a dielectric plate in said case having a first opening smaller than and opposite said window and a second opening similar to the first spaced away from said window; a first conductive grid mounted in said first opening; a second conductive grid similar to said first grid mounted in said second opening; an electric circuit connected to said grids whereby the resistance of one may be balanced against the resistance of the other; and a plate of heat insulating material interposed between said dielectric plate and the side of said case containing said window, said heat insulating plate having an opening therein smaller than said first grid opening and situated between said window and said grid.

5. In a thermo balance of the class described: an enclosed case having a relatively small window opening in one side thereof; a window in said opening composed of material which is transparent to radiant heat; a dielectric plate in said case having a first opening opposite said window and a second opening similar to the first spaced away from said window; a first conductive grid mounted in said first opening; a second conductive grid similar to said first grid mounted in said second opening; and an electric circuit connected to said grids whereby the resistance of one may be balanced against the resistance of the other, said case having a second window therein on the side opposite said first window and in coaxial relation therewith.

6. A thermo balance of the class described embodying: a closed case formed of material substantially opaque to radiant heat; a relatively small window of material transparent to radiant heat formed in one side of said case; a plate of heat insulating material mounted in said case adjacent the side thereof containing said window, said plate having an opening therein opposite said window, said opening being smaller than said window and positioned in coaxial relation therewith; a dielectric plate mounted on the opposite side of said heat insulating plate, said dielectric plate having a first opening larger than the opening in said insulating plate and in coaxial relation therewith, and a second opening similar to said first opening and spaced a substantial distance away from said first opening; conductive grids in said first and second openings; and circuit means connecting said grids so that they constitute adjacent arms of a balanced circuit.

7. In a thermo balance of the class described: an enclosed case; a pair of relatively small coaxial windows in opposite sides of said case near one end thereof; a first grid mounted in said case in thermally and electrically insulated relation therewith and in coaxial alignment with said windows; a second identical grid mounted in said case in thermally and electrically insulated relation therewith and spaced a substantial distance away from said first grid and said windows so that it is completely shielded by the walls of said case; and circuit means connecting said grids so that they constitute adjacent arms of a balanced circuit.

WILLIAM F. ALDER.